United States Patent
Liang et al.

(10) Patent No.: US 6,579,921 B1
(45) Date of Patent: Jun. 17, 2003

(54) MODIFIED BITUMINOUS COMPOSITION FOR ROOF MEMBRANES

(75) Inventors: Zhi Zhong Liang, Richmond Hill (CA); Yan-Ping Zhang, Richmond Hill (CA)

(73) Assignee: Polyphalt Inc., Toronto (CA)

( * ) Notice: Subject to any disclaimer, the term of this patent is extended or adjusted under 35 U.S.C. 154(b) by 0 days.

(21) Appl. No.: 09/890,107

(22) PCT Filed: Jan. 26, 2000

(86) PCT No.: PCT/CA00/00069

§ 371 (c)(1),
(2), (4) Date: Sep. 28, 2001

(87) PCT Pub. No.: WO00/44975

PCT Pub. Date: Aug. 3, 2000

Related U.S. Application Data

(60) Provisional application No. 60/117,427, filed on Jan. 27, 1999.

(51) Int. Cl.⁷ .................................................. C08L 95/00
(52) U.S. Cl. ............................ 524/68; 524/71; 428/147
(58) Field of Search ...................... 524/68, 71; 428/147

(56) References Cited

U.S. PATENT DOCUMENTS

| 5,322,867 A | 6/1994 | Kluttz ........................ 524/68 |
| H1484 H | 9/1995 | Collins ........................ 524/68 |

FOREIGN PATENT DOCUMENTS

| EP | 0 317025 A1 | 5/1989 |
| EP | 0 730006 A | 9/1996 |
| GB | 2 038848 A | 7/1980 |

*Primary Examiner*—Peter Szekely
(74) *Attorney, Agent, or Firm*—Sim & McBurney

(57) ABSTRACT

Roofing membranes are provided with both high stiffness at high temperature (greater than 110 ° C.) and good flexibility at low temperature (less than −20 ° C.). Bituminous compositions may be more effectively used in such membranes at lower elastomer concentration than currently practiced, using conventional cross-linking reagents to prepare the modified bituminous compositions with a range of viscosities that are readily processed as compared with conventional non-cross-linked systems.

12 Claims, No Drawings

MODIFIED BITUMINOUS COMPOSITION FOR ROOF MEMBRANES

This application claims the benefit of provisional application Ser. No. 60/117,427 filed Jan. 27, 1999.

FIELD OF INVENTION

The present invention relates to waterproofing products, particularly elastomer-modified roof membranes using thermoplastic rubber (TR) modified bituminous compositions with an improved cost/performance balance.

BACKGROUND TO THE INVENTION

Bitumen is an excellent waterproofing material that has long been used in roofing applications. It is easy to apply and cheap. Roofing-grade bitumens (usually known as oxidized or 'blown' bitumen) have been used successfully for more many decades.

However, air-blown bitumens cannot cope with the demands of modern roofs: roofing felts need to last longer than ever and to be stable under the very varied conditions that exist worldwide. Modem roofs tend to be lighter than their predecessors, and better insulated, which widens even further the temperature range to which the surface is subject.

Such demands triggered the introduction of bituminous roofing membranes modified with various polymers about 20 to 30 years ago. Although use of polymer-modified bitumen membranes has become very widespread and, in some regions even more common than air-blown bitumen, only two polymer types have yet achieved significant commercial success in bituminous roofing applications, namely thermoplastic polyolefin ('plastomer') and thermoplastic rubbers (TRs). Amorphous (or atactic) polypropylene (APP) is the most prominent plastomer. TRs are represented almost exclusively by the styrene-butadiene-styrene (SBS) triblock copolymers.

Field studies and well documented application histories have helped the roofing industry to appreciate the improved properties and long-term performance of SBS-modified bitumen membranes.

The roofing industry, however, is looking more than ever to optimize the cost-performance balance of their modified bitumen roofing products. In practice, this means that the manufacturers of SBS modified roofing membranes aim to use the lowest amount of SBS copolymer possible without jeopardizing membrane properties and characteristics.

Conventional practice involves using SBS as a modifier at loading levels generally from about 10 to about 15 wt % of the bitumen, typically about 12% to 14 wt %. It has been found, when the bitumen is modified with this level of SBS, the bitumen goes through a phase inversion (the change of a compound into an isometric form) in which its characteristics change to those of the rubber additives. This results in a bituminous membrane with an excellent balance of flexibility at cold temperatures (i.e. below −20° C.) and high flow resistance at high temperatures (i.e. above 110° C.). Below this range of SBS loading, the modified membranes tend to fail the above performance targets and other criteria that may be specified by the relevant roofing authorities.

An objective of this invention is to develop and manufacture SBS-modified roofing sheets using a lower amount of SBS co-polymer without jeopardizing performance criteria of the products or to achieve a better performance at the same loading level with respect to conventional SBS-modified roofing sheets.

It has been recognized that bitumens are complex mixtures of hydrocarbon molecules, ranging from low molecular weight oil (maltene fraction) to heavy, polymeric-type molecules (asphaltenes). Bitumen-polymer blending has undergone years of research and practical development. More than ten types of SBS copolymers have found use in modified bitumens, and all differ in composition and molecular structure. In roofing sheet design, the bitumen type is one of most significant variables and proper selection is considered highly important.

For roofing membrane applications, in addition to SBS polymers and asphalt, other ingredients including fillers, such as, limestone-$CaCO_3$, must be incorporated into the blend. The fillers make up as much as 15% to 30% by wt of the compound.

Therefore, SBS and filler together blended into the bitumen binder determine the rheological behavior of the modified bitumen. The modified bitumen is then coated on a polyester fiber mat or glass fiber mat. These membranes may, if desired, be coated with granules to provide enhanced properties, such as resistance to UV degradation.

The present invention is directed towards developing SBS/filler modified roofing membranes at a lower loading levels of SBS without jeopardizing performance criteria of the products or achieving better performance at the same loading level with respect to conventional materials and methods.

SUMMARY OF INVENTION

According to the present invention, in-situ vulcanization of SBS copolymer into .filler-filled bitumen matrix using conventional cross-linking reagents is employed to more effectively use the elastomer without jeopardizing the characteristics of the modified roofing membrane.

As far as I am aware, there is no prior art teaching that the technique of in-situ cross-linking of the elastomer can be applied to the above-described bituminous roofing membrane system to achieve both higher temperature performance and even better low temperature flexibility of the product in comparison to a non-cross linked system containing the same amount and type of SBS copolymer.

It has been recognized, however, that the prior art that the technique of the in-situ cross-linking of the elastomer has been applied for the paving grade modified bitumen products where SBS is used in relatively lower amounts, generally in a range from 2 to 5%, in which the bitumen behavior predominates.

However, once SBS is loaded up to the higher levels required for modified roofing membrane systems, in-situ cross-linking has been considered to (i) increase the risk of not only forming an un-processable, highly viscous, gel-like binder and (ii) degrade the low temperature flexibility of the finished product.

Accordingly, in one aspect of the present invention, there is provided a roofing membrane having cold flexibility below about −20° C., preferably below about −25° C., and high flow resistance (stiffness) above about 110° C., preferably above about 120° C. This membrane comprises a matrix-filled fibrous substrate and a filled elastomer-modified bituminous composition comprising about 10 to about 30 wt % of a mineral filler and a bituminous composition comprising bitumen and about 8 to 15 wt % of said bitumen of an elastomer having a conjugated diene structure cross-linked to an extent to permit a reduction of about 10 to 20 wt % in the amount of elastomer in the bituminous composition for the same low and high temperature properties or a concomitant improvement in low and high temperature properties at the same amount of elastomer.

In the present invention, the elastomer modifier may be a diene rubber or butadiene based polymer or co-polymer, preferably a styrenic elastomer, such as a styrene-butadiene random copolymer (SBR), a di-block copolymer (SB) or a tri-block copolymer (SBS) or a combination thereof. As mentioned previously, elastomers having a conjugated diene structure, namely SBS, have conventionally been used in an amount of about 10 to about 15 wt %, typically about 12 to about 14 wt %. By effecting cross-linking according to the invention, the amount of such elastomer employed may be reduced by about 10 to 20% without any loss of low temperature flexibility as compared to the non-cross-linked composition. Similarly, at the same loading level as the non-cross-linked composition, improvements in both low temperature and high temperature performance are achieved in comparison to the non-cross-linked composition.

The cross-linking reagents used in this invention may be different types of reagents among those conventional chemical additives used in bituminous systems, such as elemental sulfur, a sulfur based vulcanization system and/or a phenol-aldehyde resin based cross-linking system.

As may be seen from the experimental results herein, differing amounts of cross-linking reagent are required when a different type of cross-linking reagent is used according to the process procedures of the invention. In general, when sulfur is used for cross-linking, the amount employed is about 0.05 to about 0.2 wt %, preferably about 0.1 to about 0.15 wt % of the bitumen composition. When a phenol-formadehyde resin is used for cross-linking, the amount employed is about 0.1 to about 0.25 wt %, preferably about 0.15 to about 0.20 wt %, of the bitumen composition. The compositions employed need to be adjusted based on the reagent type to achieve the corresponding performance of bituminous compositions modified using another cross-linking agent.

A key feature of the present invention is the manner in which the cross-linking is effected. Only small amounts of cross-linking agents are employed, as discussed above. If too much cross-linking agent is employed in an attempt to reduce the amount of elastomer, then the low temperature flexibility will be impaired and there is a risk of gelation. If too little cross-linking agent is employed, then the desired high temperature stiffness level cannot be achieved.

In order to achieve the desired low and high temperature properties, it is important that oxidation of the system is minimized during cross-linking. The ingestion of ambient air into the bitumen composition during the cross-linking should be minimized. Such minimization may be effected in any convenient manner, depending on the configuration of the manufacturing system. For example, on a laboratory scale, oxidation of the system is minimized by maintaining the system quiescent by controlling the level of agitation such as to provide a minimum vortex during a conditioning step. On a plant scale, mixing may be continued provided that such mixing does not result in any significant degree of incorporation of ambient air. Alternatively, a form of blanketing the material with nitrogen or other suitable materials can also serve the same purpose.

Accordingly, in another aspect of the present invention, there is provided a method of forming a roofing membrane comprising a fibrous substrate and a filled bituminous composition, which comprises:

(a) fully dispersing into bitumen an elastomer having a conjugated diene structure in an amount of about 8 to about 13 wt % of the bitumen, (b) dispersing a cross-linking reagent for said elastomer in a predetermined amount depending on the reagent used, (c) permitting said cross-linking reagent to cross-link said elastomer while minimizing the incorporation of air into the composition, (d) blending a mineral filler in an amount of about 10 to about 30 wt % of the composition to provide a filled bituminous composition, and (e) forming a roofing membrane from said filled bituminous composition having about 10 to 20 wt % less elastomer in the bitumen for the same low and high temperature properties or a concomitant improvement in low and high temperature properties for the same amount of elastomer.

The low temperature and high temperature properties of the roofing membrane may be in accordance with any relevant specification required for such roofing products. For example, the products of the invention may meet the standards set by the European Union in its "Special Directives for the Assessment of Reinforced Homogeneous Waterproof Coverings of Styrene-Butadiene-Styrene (SBS) Elastomer Bitumen" of Aug. 1984 (MDAT No. 31:1984).

GENERAL DESCRIPTION OF INVENTION

The term "bitumen" used herein means a class of black or dark-colored (solid, semi-solid or viscous) cementitious substances, natural or manufactured, composed principally of high molecular weight hydrocarbons of which asphalts, tars, pitches and asphaltites are typical. The term "asphalt" used herein means a dark, brown to black, cementitious material, solid or semi-solid in consistency, in which the predominating constituents are bitumens that occur in nature, as such, or are obtained as residue in petroleum refining.

The bitumens which may be used in the present invention vary widely in softening point, generally from about 20° to 65° C., preferably about 25° to 55° C. The bitumen may comprise about 75 to about 90 wt % of the total composition, preferably about 85 to about 92 wt % of the total composition.

The elastomers which may be used in the present invention have a conjugated diene structure and may vary from elastomeric polymers to elastomeric copolymers or thermoplastic elastomers. The elastomeric copolymers or thermoplastic elastomers. The elastomeric polymers may be those conjugated diene polymers selected among butadiene, isoprene and their functionalized polymers, such as those with halogenated or carboxylated groups. The elastomeric copolymers are thermoplastic elastomers or are conjugated diene based copolymers with another type of polymer, such as styrene and isobutylene. The copolymers may be a random or a block; di-sequenced; multi-sequenced, or a statistical copolymer. Suitable elastomers include NR, SBR, SB and SBS. The potential for compatibilizing these high molecular weight elastomers of widely varying properties in bituminous compositions is another primary advantage of the present invention.

The elastomers which can be used include those having a molecular weight (MW) range from about 45,000 to about 750,000, preferably about 150,000 to about 450,000. These polymeric elastomers are available from a variety of commercial sources.

Such elastomers may be present in the bituminous compositions of the invention in an amount of about 8 to about 13 wt % of the total composition, preferably about 10 to about 12 wt %, depending on the end use to which the composition is put.

The quantity of elemental sulfur which is employed in the invention, generally varies from about 0.05 to about 0.2 wt %, preferably about 0.1 to about 0.15 wt %, based on the amount of bitumen in the composition prior to filing with mineral filler. A corresponding quantity of an alternative cross-linking agent may be used.

According to the present invention, there is a difference in the quantity of reagent required when a different type of cross-linking reagent is used. Following the inventive procedure, with a certain type of reagent involved, a fixed loading relative to the elastomer dispersed system needs to be defined to achieve modified bituminous compositions having significantly improved high temperature performance without loss of flexibility at low temperature. Such performance can be achieved without cross linking but at higher polymer loadings in the corresponding non-cross-linked system. The compositions or formulations are adjusted accordingly in terms of reagent load level, if a different reagent type is used, in order to achieve the desired performance of the modified bitumen.

EXAMPLES

This invention is illustrated by the following Examples:

EXAMPLE 1

This Example is an example of the process of the invention and of the compositions attainable thereby.

In this Example, the elastomer modifier used was a tri-block copolymer (SBS: Fina 411, a high molecular weight of star-type sequence SB connection structure). The cross-linking reagents selectively used were two different types of reagents, namely elemental sulfur and phenol-aldehyde resin (marketed by TexPar). The compositions and testing results are shown in Table I below.

The compositions were prepared using the following procedure: SBS was fully dispersed and mixed into bitumen using a Polytron mixer at a temperature range about 185° C. for about 60 minutes. The cross-linking reagent was quickly dispersed into the elastomer dispersed bitumen mixture at a fixed amount, depending on the type of the reagent used (see formulations in Table I) and mixing was carried on for about 45 minutes. Then, the agitation was stopped and the temperature was maintained at above 150° C. to about 5° C. below the mixing temperature for about 60 minutes. Finally, the mixing was continued at the stated mixing temperature again for 15 to 30 minutes to end up with the desired finished product.

As may be seen from Table I, a shift in the amount of reagent was required when a different type of cross-linking reagents was used. With elemental sulfur as the cross-linking reagent involved, a fixed load to the elastomer dispersed system was defined at 0.1% by wt to achieve a modified bituminous composition having a clearly improved temperature performance without loss of flexibility property at low temperature with respect to the corresponding non-cross-linked system. With phenol-aldehyde resin based cross-linking reagent, a fixed load to the elastomer-dispersed system was defined at 0.15% by wt to achieve the same targeted performance.

EXAMPLE 2

This Example is an example of conventional elastomer modification of bitumen.

In this Example, the elastomer modifier used was the same type as in Example 1. The same cross-linking reagents from Example I were also used.

The compositions were prepared using the conventional procedure: SBS was dispersed, followed by addition of the reagent and mixed in bitumen at the same processing temperature using the Polytron mixer for about 1 or 2 hours. The process also involved the procedure based on the recent prior art using incremental loading technique of reagent and/or SBS at the same processing temperature using Polytron mixer for the same period of time.

The compositions or formulations and testing results are shown in Table II below.

The results set forth in Tables I and II show that acceptable performance in terms of softening point, (high temperature stiffness) and cold flexibility can be achieved at significantly lower polymer loadings than in the prior art, as demonstrated in the case of IS- 2, IS- 4 and ID- 2. All comparative examples that used a polymer loading of less than 12% failed one or the other of the criteria, as did Inventive Examples with excessive cross-linking reagent IS-3 and ID–2. Note also that the quantity of cross-linking agent needed depends on the reagent. In addition, by comparison of Table II samples IS-4, IS- 5, IS- 2 and ID- 3, it can be seen that the performance criteria are retained in the presence of filler.

TABLE I

INVENTIVE EXAMPLE

| Ingredient | CI-1 | CI-2 | IS-1 | IS-2 | IS-3 | IS-4 | IS-5 | ID-1 | ID-2 | ID-3 |
|---|---|---|---|---|---|---|---|---|---|---|
| Bitumen (B 200) | 88 | 90 | 89.95 | 89.9 | 89.85 | 89.4 | 68.77 | 89.85 | 89.8 | 69.1 |
| SBS | 12 | 10 | 10 | 10 | 10 | 10.5 | 8.08 | 10 | 10 | 7.69 |
| Sulfur | — | — | 0.05 | 0.1 | 0.15 | 0.1 | 0.08 | — | — | — |
| Phenol-aldehyde resin | — | — | — | — | — | — | — | 0.2 | 0.15 | 0.12 |
| Filler (limestone) | — | — | — | — | — | — | 23.08 | — | — | 23.1 |
| PERFORMANCE | | | | | | | | | | |
| Viscosity at 180° C. | 1,500 | 1025 | 1073 | 1302 | 1555 | 1460 | 4115 | 1507 | 1237 | 3250 |
| Softening Point, ° C. | 120 | 114 | 115 | 120 | 124 | 123 | 123 | 121 | 120 | 120 |
| Penetration at 25° C. | — | — | — | — | — | — | 46 | — | — | 47 |
| Cold Flexibility –25° C. | P | P | P | P | F | P | P | F | P | P |

TABLE II

COMPARATIVE EXAMPLE

| Ingredient | CC-1 | CC-2 | CS-1 | CS-2 | CD-2 | CD-3 |
|---|---|---|---|---|---|---|
| Bitumen (B 200) | 88 | 90 | 89.95 | 89.8 | 89.85 | 89.8 |
| SBS | 12 | 10 | 10 | 10 | 10 | 10 |
| Sulfur | — | — | 0.05 | 0.2 | — | — |
| Phenol-aldehyde resin | — | — | — | — | 0.15 | 0.2 |
| PERFORMANCE | | | | | | |
| Viscosity at 180° C. | 1,500 | 1,025 | 1740 | 1930 | 1310 | 1507 |
| Softening Point, ° C. | 120 | 114 | 115 | 124 | 114 | 121 |

TABLE II-continued

COMPARATIVE EXAMPLE

| | Code | | | | | |
|---|---|---|---|---|---|---|
| Ingredient | CC-1 | CC-2 | CS-1 | CS-2 | CD-2 | CD-3 |
| Cold Flexibility, ° C. | | | | | | |
| −20° C. | | | F | F | | P |
| −25° C. | P | P | F | F | P | F |

EXAMPLE 3

Modified bituminous roofing membranes have been prepared using the sulfur-reacted SBS-filler modified bitumen system, in which a polyester reinforcement mat (width/thickness: 100 mm/1.4mm) is used as the carrier and the top ply of the membrane surfaced with slate granules. The SBS-filler modified binder was coated on the carrier at a rate of approximately 3,600 g/m$^2$. The compositions and results of the roofing membranes set forth in Table III prove that acceptable performance in terms of softening point, flow resistance at 100C for 2 hours and cold bend temperature can be achieved at significantly lower polymer loading levels, in fact over 15% less polymer by wt. of the bitumen, as compared to conventional processing.

TABLE III

Modified Bituminous Membranes

| Modified Bitumen Composition (%) | Conventional | Inventive-A | Inventive-B |
|---|---|---|---|
| Bitumen (B 200) | 71.85 | 66.25 | 68.79 |
| SBS | 9.63 | 7.77 | 8.07 |
| Sulfur | — | 0.074 | 0.077 |
| Limestone | 25.91 | 25.91 | 23.06 |

| Membrane Performance | Conventional SBS modified Membrane | Inventive SBS modified Membrane | Inventive SBS modified Membrane |
|---|---|---|---|
| Flow resistance @ 100 C. for 2 hours | Pass | Pass | Pass |
| Softening Point, ° C. | 116 | 117 | 115 |
| Cold Flexibility, −25° C. | Pass | Pass | Pass |

SUMMARY OF THE DISCLOSURE

In the summary of this disclosure, the present invention provides novel bituminous compositions used to produce roofing membranes having the desired characteristics of stiffness at high temperatures and cold flexibility, using cross-linked elastomeric polymer modifiers at a significantly lower proportion of such polymer, as well as a novel procedure for the preparation of said compositions. Modifications are possible within the scope of this invention.

What is claimed is:

1. A roofing membrane having cold flexibility below about −20° C. and high flow resistance above about 110° C., comprising a matrix-filled fibrous substrate and a filled elastomer-modified bituminous composition comprising about 10 to about 30 wt % of said composition of a mineral filler and a bituminous composition comprising bitumen and about 8 to 13 wt % of said bitumen of an elastomer having a conjugated diene structure cross-linked to an extent to permit a reduction of about 10 to 20 wt % in the amount of elastomer in the bituminous composition for the same low and high temperature properties or a concomitant improvement in low and high temperature properties at the same amount of elastomer.

2. The roofing membrane of claim 1 wherein said elastomer is employed in an amount of about 10 to 12 wt %.

3. The roofing membrane of claim 1 wherein said filler is employed in an amount of about 15 to about 25 wt %.

4. The roofing membrane of claim 1 wherein said elastomer is a styrene-butadiene-styrene polymer.

5. The roofing membrane of claim 1 wherein said elastomer is cross-linked using a cross-linking agent in a minimum amount such that the desired high temperature stiffness level is achieved at the lower amount of elastomer and in a maximum amount with the low temperature flexibility is not impaired at the lower amount of elastomer.

6. A method of forming a roofing membrane comprising a filled bituminous composition, which comprises:

(a) fully dispersing into bitumen an elastomer having a conjugated diene structure in an amount of about 8 to about 13 wt % of the bitumen, (b) dispersing a cross-linking reagent for said elastomer in a predetermined amount depending on the reagent used, (c) permitting said cross-linking reagent to cross-link said elastomer while minimizing the incorporation of air into the composition, (d) blending a mineral filler in an amount of about 10 to about 30 wt % of the composition to provide a filled bituminous composition, and (e) forming a roofing membrane from said filled bituminous composition having about 10 to 20 wt % less elastomer in the bitumen for the same low and high temperature properties or a concomitant improvement in low and high temperature properties for the same amount of elastomer.

7. The method of claim 6 wherein said cross-linking agent is elemental sulfur and is used in an amount of about 0.05 to about 0.2 wt %.

8. The method of claim 7 wherein the amount of elemental sulfur employed is about 0.1 to about 0.15 wt %.

9. The method of claim 6 wherein said cross-linking agent is phenol-formaldehyde and is used in an amount of about 0.1 to about 0.25 wt %.

10. The method of claim 9 wherein the amount of phenol-formaldehyde used is about 0.15 to about 0.20 wt %.

11. The method of claim 6 wherein said elastomer is used in an amount of about 10 to about 12 wt %.

12. The method of claim 6 wherein said filler is employed in an amount of amount of 15 to about 25 wt %.

* * * * *